US012504133B2

(12) United States Patent
Bai et al.

(10) Patent No.: US 12,504,133 B2
(45) Date of Patent: Dec. 23, 2025

(54) LAMP WITH NIGHT LAMP FUNCTION

(71) Applicant: NINGBO JINGHUI OPTO-ELECTRONIC CO., LTD., Zhejiang Province (CN)

(72) Inventors: Guohui Bai, Zhejiang Province (CN); Xia Xiao, Zhejiang Province (CN)

(73) Assignee: NINGBO JINGHUI OPTO-ELECTRONIC CO., LTD. (CN)

( * ) Notice: Subject to any disclaimer, the term of this patent is extended or adjusted under 35 U.S.C. 154(b) by 0 days.

(21) Appl. No.: 18/642,175

(22) Filed: Apr. 22, 2024

(65) Prior Publication Data

US 2025/0198579 A1 Jun. 19, 2025

(30) Foreign Application Priority Data

Dec. 15, 2023 (CN) ........................ 202323430264.4

(51) Int. Cl.
*F21S 2/00* (2016.01)
*F21S 4/28* (2016.01)
*F21V 21/088* (2006.01)
*F21V 23/00* (2015.01)

(52) U.S. Cl.
CPC . *F21S 2/00* (2013.01); *F21S 4/28* (2016.01); *F21V 21/088* (2013.01); *F21V 23/008* (2013.01); *F21V 2200/20* (2015.01)

(58) Field of Classification Search
CPC .. F21S 2/00; F21S 4/28; F21V 21/088; F21V 23/008; F21V 2200/20
See application file for complete search history.

(56) References Cited

U.S. PATENT DOCUMENTS

| | | | | |
|---|---|---|---|---|
| 11,255,498 | B2 * | 2/2022 | Van Winkle .............. | F21V 5/04 |
| 11,761,597 | B1 * | 9/2023 | Zheng ..................... | F21S 8/026 362/235 |
| 12,164,141 | B2 * | 12/2024 | Li ........................... | F21S 8/026 |
| 2007/0285921 | A1 * | 12/2007 | Zulim .................... | H05B 47/17 362/240 |
| 2014/0071679 | A1 * | 3/2014 | Booth ..................... | F21S 8/026 362/249.02 |

(Continued)

FOREIGN PATENT DOCUMENTS

TW 201219718 A * 5/2012 .............. F21V 17/10

*Primary Examiner* — Zheng Song
(74) *Attorney, Agent, or Firm* — Marian E. Fundytus; Amster Rothstein & Ebenstein LLP

(57) ABSTRACT

Disclosed is a lamp with a night lamp function, including a housing, a main illumination assembly and a night lamp illumination assembly. The main illumination assembly has a main light exit surface. A first housing panel of the housing opposite to the main light exit surface is provided with a main light exit port, and light exiting from the main light exit surface irradiates an outside of the housing. The first housing panel is arranged at a distance from the main light exit surface in an axial direction. The night lamp illumination assembly is arranged between the main light exit surface and the first housing panel. The night lamp illumination assembly has a night lamp light exit surface. The housing is provided with a night lamp light exit port. A light shielding member is arranged between the main illumination assembly and the night lamp illumination assembly.

9 Claims, 3 Drawing Sheets

(56) References Cited

U.S. PATENT DOCUMENTS

| | | | | |
|---|---|---|---|---|
| 2014/0160736 A1* | 6/2014 | Chung | F21S 8/03 362/249.02 |
| 2014/0268823 A1* | 9/2014 | Mandy | F21V 17/12 29/592.1 |
| 2022/0082244 A1* | 3/2022 | Lupien | F21V 25/12 |
| 2022/0170600 A1* | 6/2022 | Kim | F21V 17/002 |
| 2023/0032592 A1* | 2/2023 | Kim | F21V 23/006 |
| 2023/0341116 A1* | 10/2023 | Huang | F21V 23/0471 |

* cited by examiner

LAMP WITH NIGHT LAMP FUNCTION

CROSS REFERENCE TO RELATED APPLICATIONS

The present application claims priority to China Application No. 202323430264.4 filed Dec. 15, 2023, the subject matter of which is incorporated herein by reference in its entirety.

TECHNICAL FIELD

The present disclosure relates to the field of illumination equipment, and in particular to a lamp with a night lamp function.

BACKGROUND

Lamps are essential appliances in people's lives. They can provide light for people in a dim environment.

The lamps on the market usually have a single function and a high brightness in order to illuminate the overall environment. However, the lamp with a high brightness is not suitable as a night lamp for getting up, and may make people feel not sleepy and affect the sleep of those around them. Therefore, the user may need to buy an additional night lamp. However, the additional night lamp needs to occupy an additional electrical socket, which is not convenient for the user and increases the cost of the user.

SUMMARY

In order to overcome the defects in the prior art, the present disclosure provides a lamp with a night lamp function. A main illumination assembly and a night lamp illumination assembly arranged can satisfy different demands of users for main illumination and night light illumination. Moreover, a light shielding member is arranged to prevent the main illumination assembly and the night lamp illumination assembly from interfering with and influencing each other.

In order to achieve the above purpose, the present disclosure adopts the following technical solution:

The present disclosure provides a lamp with a night lamp function, including a housing, and a main illumination assembly and a night lamp illumination assembly arranged in the housing. The main illumination assembly has a main light exit surface where main illumination light exits. A first housing panel of the housing opposite to the main light exit surface is provided with a main light exit port, and light exiting from the main light exit surface irradiates an outside of the housing through the main light exit port. The first housing panel is arranged at a distance from the main light exit surface in an axial direction. The night lamp illumination assembly is arranged between the main light exit surface and the first housing panel. The night lamp illumination assembly has a night lamp light exit surface where night lamp light exits, and the housing is provided with a night lamp light exit port for exposing the night lamp light exit surface. A light shielding member capable of shielding light is arranged between the main illumination assembly and the night lamp illumination assembly.

With the above structure, the user may operate the lamp with a night lamp function to make the main illumination assembly or the night lamp illumination assembly work. When the main illumination assembly works, the main illumination light exits from the main light exit surface on the main illumination assembly and irradiates the outside of the housing through the main light exit port on the housing, thereby providing illumination for the user. When the night lamp illumination assembly works, the night lamp light exits from the night lamp light exit surface on the night lamp illumination assembly and irradiates the outside of the housing through the night lamp light exit port on the housing, thereby providing illumination for the user. Usually, the night lamp light emitted by the night lamp illumination assembly is softer and has lower brightness and/or color temperature than the main illumination light emitted by the main illumination assembly, which is suitable as a night lamp for the user to get up in the night to illuminate.

In the above structure, the light shielding member arranged can prevent the main illumination assembly and the night lamp illumination assembly from interfering with and influencing each other. Specifically, the light shielding member is a light shielding piece.

Further, the night lamp light exit port is arranged between the main light exit surface and the first housing panel and located on a side close to the main light exit port, and light exiting from the night lamp light exit surface passes through the night lamp light exit port and then irradiates the outside of the housing through the main light exit port.

With the above structure, since both the main illumination light and the night lamp light irradiate the outside of the housing through the main light exit port on the housing, and there is no need to consider whether the mounting environment shields the main illumination light and the night lamp light when mounting the lamp with a night lamp function, so this application has low requirements for the mounting environment of the lamp. Moreover, the structure of this application is compact and reasonable.

Further, the night lamp illumination assembly includes a night lamp support and a night lamp body for emitting night lamp light, and the night lamp support is arranged between the first housing panel and the main light exit surface. The night lamp support has a night lamp body accommodating groove for accommodating the night lamp body. The night lamp body is arranged in the night lamp body accommodating groove, and at least a part of the night lamp support opposite to a light exit side of the night lamp body is made of a light-transparent material. An outer side surface of the night lamp support opposite to the light exit side of the night lamp body and away from the night lamp body forms the night lamp light exit surface.

With the above structure, the night lamp support is configured to support the main illumination assembly such that the main light exit surface of the main illumination assembly is arranged at a distance from the first housing panel, and the night lamp support arranged provides the mounting environment for the mounting of the night lamp body. Moreover, at least a part of the night lamp support is made of the light-transparent material, so that the light emitted by the night lamp body is emitted to the side of the night lamp light exit port through the light-transparent part of the night lamp support, and finally exits through the outer side surface of the night lamp support away from the night lamp body so as to irradiate the outside of the housing through the night lamp light exit port, that is, the outer side surface of the night lamp support opposite to the light exit side of the night lamp body and away from the night lamp body forms the night lamp light exit surface. Specifically, the whole night lamp support is made of the light-transparent material, which is convenient for production of the night lamp support.

Further, a light exit direction of the night lamp body faces an axis of the main light exit port.

With the above structure, the night lamp light exit port is arranged on the side close to the main light exit port, and the light emitted by the night lamp body can pass through the night lamp light exit port and irradiate the outside of the housing through the main light exit port. The above structure is reasonable in arrangement.

Further, the night lamp support includes a supporting plate portion and a supporting leg portion, and the supporting plate portion is arranged opposite to the first housing panel and arranged at a distance from the first housing panel. One end of the supporting leg portion is arranged on a side of the supporting plate portion facing the first housing panel, and the other end extends toward the first housing panel.

Side walls of the supporting plate portion, the first housing panel, the supporting leg portion and the housing are enclosed to form the night lamp body accommodating groove; or a plurality of the supporting leg portions are provided, and the supporting plate portion, the first housing panel and the two adjacent supporting leg portions are enclosed to form the night lamp body accommodating groove.

With the above structure, due to the arrangement of the supporting plate portion, the main light exit surface of the main illumination assembly can be placed on the night lamp support more stably and reliably. The supporting leg portion is arranged to support the supporting plate portion.

Further, the first housing panel protrudes toward the supporting plate portion to form a support limit rib. The supporting plate portion is respectively provided with the supporting leg portions on two sides of a position corresponding to the support limit rib.

With the above structure, the support limit rib arranged can position the night lamp support when mounting the night lamp support. During use, the support limit rib cooperates with the supporting leg portions on the two sides to limit the night lamp support and prevent the night lamp support from deviating.

Further, an outer side surface of the supporting leg portion close to a side of the main light exit port forms the night lamp light exit surface; or the night lamp support includes an outer side portion, the outer side portion is arranged on a side away from the night lamp body in the supporting leg portion away from the night lamp body, and the outer side portion is arranged opposite to the light exit side of the night lamp body; and one end of the outer side portion is connected with an end facing the first housing panel in the supporting leg portion close to the side of the main light exit port, and the other end extends toward the main light exit surface. A side of the outer side portion away from the night lamp body forms the night lamp light exit surface.

With the above structure, the structure of the night lamp support is more reasonable.

Further, along a direction from the main light exit port to the main light exit surface, the outer side portion is inclined a side away from the night lamp body.

With the above structure, the structure of the night lamp support is more reasonable. Since the outer side portion is inclined, the night lamp light exit surface is also inclined, which makes light exiting from the night lamp illumination assembly more reasonable.

Further, a side of the outer side portion facing the supporting leg portion is stepped.

With the above structure, the structure of the outer side portion is more stable and reliable, and the night lamp light is refracted and reflected at the stepped side of the outer side portion, which finally makes the light exiting from the night lamp light exit surface softer.

Further, the night lamp illumination assembly includes a night lamp body for emitting night lamp light. Along a direction from the main light exit port to the main light exit surface, the night lamp light exit surface is inclined a side away from the night lamp body.

The above structure makes the night lamp light exit surface more reasonable in arrangement and the light exiting from the night lamp illumination assembly more reasonable.

Further, the night lamp light exit surface is stepped.

Specifically, the night lamp light exit surface includes first night lamp light exit surfaces and second night lamp light exit surfaces, and along the direction from the main light exit port to the main light exit surface, the first night lamp light exit surfaces and the second night lamp light exit surfaces are alternately arranged. The second night lamp light exit surfaces are arranged parallel with the first housing panel, and the first night lamp light exit surfaces are arranged at an obtuse angle with the second night lamp light exit surfaces.

With the above structure, the night lamp light is refracted and reflected at the night lamp light exit surface, which finally makes the light exiting from the night lamp light exit surface softer.

Further, the night lamp illumination assembly is annular and is arranged around an axis of the main light exit surface. Correspondingly, the light shielding member is annular and is matched with the night lamp illumination assembly.

With the above structure, the structure of the night lamp illumination assembly and the light shielding member is more reasonable in arrangement.

Further, a night lamp body in the night lamp illumination assembly is strip-shaped and is arranged around the axis of the main light exit surface.

With the above structure, the structure of the night lamp body in the night lamp illumination assembly is more reasonable in arrangement. Specifically, the night lamp body in the night lamp illumination assembly is a strip lamp provided with a plurality of LED light beads.

Further, the main illumination assembly includes a main illumination lamp body for emitting the main illumination light and a light guide plate for guiding light. A light exit side of the light guide plate is arranged opposite to the main light exit port, and the main illumination lamp body is arranged on a light entrance side of the light guide plate.

With the above structure, the main illumination light emitted by the main illumination lamp body is guided to the light exit side of the light guide plate through the light guide processing of the light guide plate and irradiates the outside of the housing through the main light exit port.

Further, the main illumination assembly includes a reflective member, and a side surface of the light guide plate forms the light entrance side of the light guide plate. The reflective member is arranged on a side of the light guide plate opposite to the light exit side of the light guide plate, and a size of the reflective member is matched with that of a side end surface of the light guide plate opposite to the light exit side.

With the above structure, the reflective member arranged reflects the light to be emitted from the side of the light guide plate opposite to the light exit side, so that light exits from the light exit side of the light guide plate, thereby ensuring the light utilization ratio. Specifically, the reflective member is reflective paper.

Further, the main illumination assembly includes a diffusing plate. The diffusing plate is arranged on the light exit side of the light guide plate, and a side end surface of the diffusing plate away from the light guide plate forms the main light exit surface.

With the above structure, the diffusing plate can convert a point or line light source into a soft and uniform surface light source.

Further, the main illumination lamp body is strip-shaped and is arranged around an axis of the light guide plate.

With the above structure, the structure of the main illumination lamp body is more reasonable. Specifically, the main illumination lamp body is a strip lamp provided with a plurality of LED light beads.

Further, the lamp with a night lamp function includes a shock absorbing member. The shock absorbing member is arranged between a side of the main illumination assembly opposite to the main light exit surface and an inner wall of the housing. Specifically, the shock absorbing member is a foam pad.

With the above structure, the shock absorbing member arranged can absorb shock of the main illumination assembly and the night lamp illumination assembly in the housing, so as to protect the main illumination assembly and the night lamp illumination assembly.

Further, the lamp with a night lamp function includes a power supply, and the power supply is connected with the main illumination assembly and the night lamp illumination assembly to provide energy therefor. Specifically, the power supply is a power adapter.

With the above structure, external power can be converted into power adapted to the main illumination assembly and the night lamp illumination assembly, so as to ensure the normal operation of the main illumination assembly and the night lamp illumination assembly.

Further, two sides of the housing are provided with torsion spring clips for fixing the lamp with a night lamp function. Correspondingly, the housing is provided with clip seats for mounting the torsion spring clips.

With the above structure, due to the arrangement of the torsion spring clips, the lamp with a night lamp function can be mounted and fixed more quickly and conveniently.

Further, the torsion spring clip includes a torsion spring arranged on the housing and a clip sleeve sleeved on the torsion spring.

With the above structure, due to the arrangement of the clip sleeves, forces can be better applied to the torsion spring clips, thereby ensuring the lamp with a night lamp function to be mounted and fixed stably and reliably.

Further, the housing includes a housing body having a mounting opening and a housing cover matched with the mounting opening, and the housing body and the housing cover are enclosed to form a space for mounting the main illumination assembly and the night lamp illumination assembly.

With the above structure, the lamp with a night lamp function can be mounted conveniently. Specifically, the main illumination assembly and the night lamp illumination assembly can be mounted into the housing conveniently.

Further, the housing body includes a surface ring and a surface ring enclosure wall. The surface ring forms the first housing panel. An inner hole of the surface ring forms the main light exit port. One end of the surface ring enclosure wall is connected with the surface ring, and the other end extends outward and forms the mounting opening.

With the above structure, the structure of the housing body is more reasonable.

Compared with the prior art, the present disclosure has the following beneficial effects:

(1) According to the lamp with a night lamp function of the present disclosure, the main illumination assembly and the night lamp illumination assembly arranged can satisfy different demands of users for main illumination and night light illumination. Moreover, the light shielding member is arranged to prevent the main illumination assembly and the night lamp illumination assembly from interfering with and influencing each other.

(2) According to the lamp with a night lamp function of the present disclosure, the night lamp light exit port is arranged between the main light exit surface and the first housing panel and located on a side close to the main light exit port, and light exiting from the night lamp light exit surface passes through the night lamp light exit port and then irradiates the outside of the housing through the main light exit port. In this way, both the main illumination light and the night lamp light irradiate the outside of the housing through the main light exit port on the housing, and there is no need to consider whether the mounting environment shields the main illumination light and the night lamp light when mounting the lamp with a night lamp function, so this application has low requirements for the mounting environment of the lamp. Moreover, the structure of this application is compact and reasonable.

BRIEF DESCRIPTION OF FIGURES

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

Figure 1:
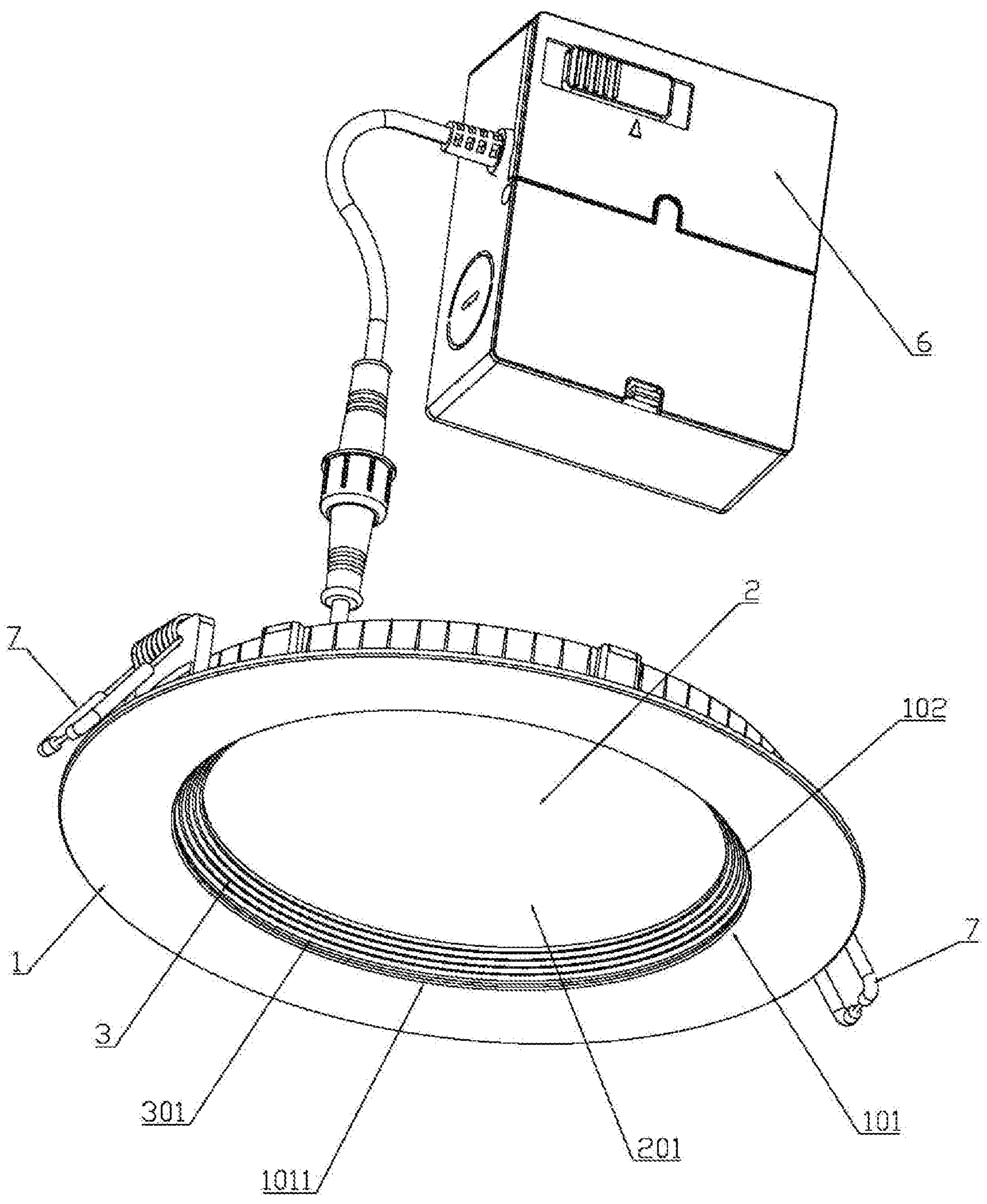
FIG. 1 is a schematic three-dimensional structural view of a lamp with a night lamp function of the present disclosure.

Corresponding component names of reference signs in the figures: 1, housing; 101, first housing panel; 1011, main light exit port; 1012, support limit rib; 102, night lamp light exit port; 103, clip seat; 104, housing body; 1041, mounting opening; 1042, surface ring; 1043, surface ring enclosure wall; 105, housing cover; 2, main illumination assembly; 201, main light exit surface; 202, main illumination lamp body; 203, light guide plate; 204, reflective member; 205, diffusing plate; 3, night lamp illumination assembly; 301, night lamp light exit surface; 3011, first night lamp light exit surface; 3012, second night lamp light exit surface; 302, night lamp support; 3021, night lamp body accommodating groove; 3022, supporting plate portion; 3023, supporting leg portion; 3024, outer side portion; 303, night lamp body; 4, light shielding member; 5, shock absorbing member; 6, power supply; 7, torsion spring clip; 701, torsion spring; 702, clip sleeve.

DETAILED DESCRIPTION

This application will be described in detail below in conjunction with accompanying drawings and specific embodiments.

The embodiments of this application are described below through specific examples. Those skilled in the art can easily understand the other advantages and effects of this application from the content disclosed in the specification. It is apparent that the described embodiments are only a part, rather than all of the embodiments of this application. This application may also be implemented or applied through other different specific implementations, and various details in the specification may also be modified or changed based on different viewpoints and applications without departing from the spirit of this application. It should be noted that the embodiments in the following and the features in the embodiments can be combined with each other in case of no conflict. All other embodiments obtained by those of ordinary skill in the art based on the embodiments of this application without creative work are within the protection scope of this application.

It is noted that various aspects of the embodiments within the scope of the appended claims are described below. It is apparent that the aspects described herein can be embodied in a wide variety of forms, and any specific structure and/or function described herein is merely illustrative. Based on this application, those skilled in the art should understand that one aspect described herein may be implemented independently of any other aspect, and two or more of these aspects may be combined in various ways. For example, equipment and/or methods may be implemented using any number of aspects described herein. In addition, the equipment and/or the method may be implemented using other structures and/or functionalities than one or more of the aspects described herein.

It should also be noted that the drawings provided in the following embodiments only schematically illustrate the basic concept of this application, and the drawings show only the components related to this application instead of being drawn according to the quantity, shape and size of the components in actual implementation. In actual implementation, the shape, quantity and proportion of the components may be changed at will, and the layout of components may be more complicated.

In addition, in the following description, specific details are provided to facilitate a thorough understanding of the examples. However, it will be understood by those skilled in the art that the present disclosure may be implemented without these specific details.

In the description of the present disclosure, it should also be noted that, unless otherwise clearly specified and defined, the terms "mount", "connect" and "link" should be understood in a broad sense. For example, it may be a fixed connection, a detachable connection or an integral connection; or may be a mechanical connection or an electrical connection; or may be a direct link or an indirect link through an intermediate medium, or may be an internal communication between two elements. For those of ordinary skill in the art, the specific meaning of the above terms in the present disclosure can be understood in specific cases.

The technical solution provided by the embodiments of this application will be described with reference to the accompanying drawings.

Figure 2:
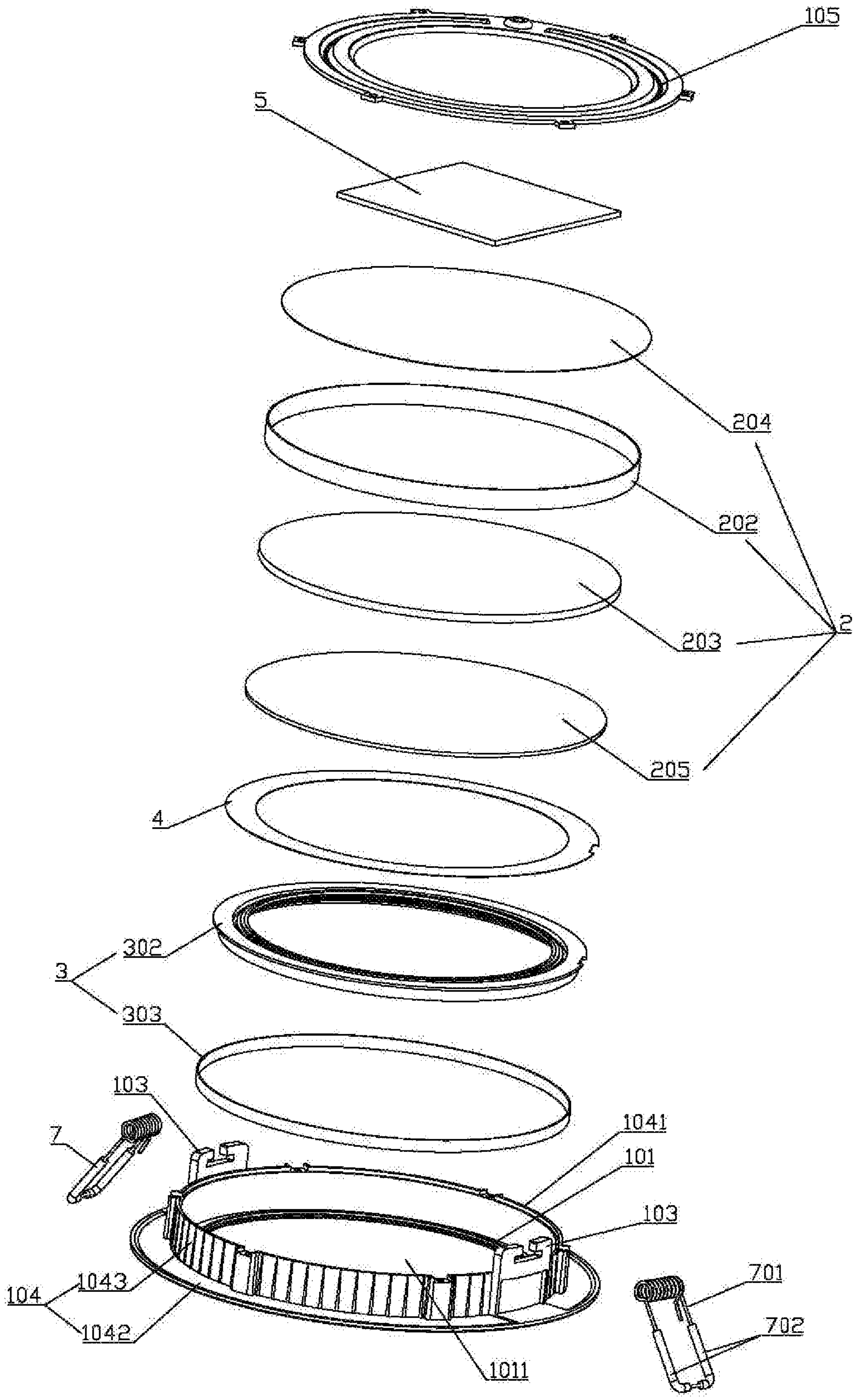
FIG. 2 is a schematic exploded structural view of the lamp with a night lamp function of the present disclosure.
Figure 3:
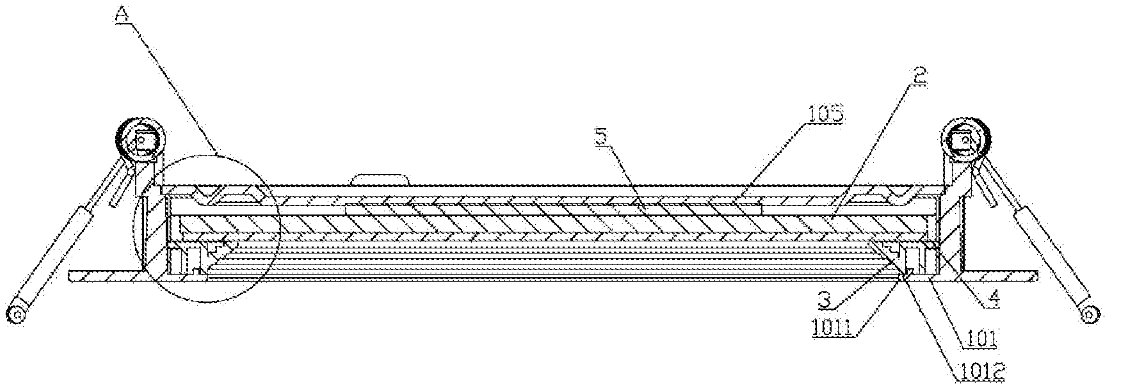
FIG. 3 is a schematic cutaway structural view of the lamp with a night lamp function of the present disclosure.
Figure 4:
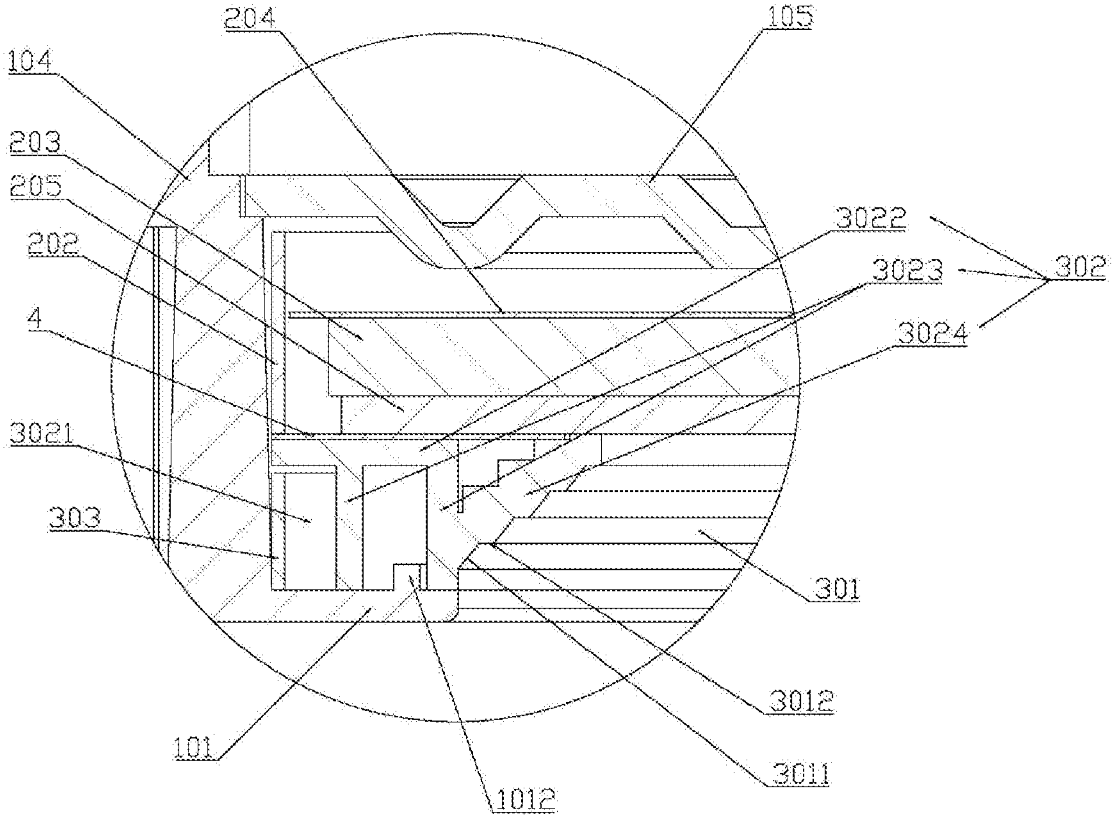
FIG. 4 is an enlarged view of location A in FIG. 3.

Referring to FIG. 1 to FIG. 4, the present disclosure provides a lamp with a night lamp function, including a housing 1, and a main illumination assembly 2 and a night lamp illumination assembly 3 arranged in the housing 1. The main illumination assembly 2 has a main light exit surface 201 where main illumination light exits. A first housing panel 101 of the housing 1 opposite to the main light exit surface 201 is provided with a main light exit port 1011, and light exiting from the main light exit surface 201 irradiates an outside of the housing 1 through the main light exit port 1011. The first housing panel 101 is arranged at a distance from the main light exit surface 201 in an axial direction. The night lamp illumination assembly 3 is arranged between the main light exit surface 201 and the first housing panel 101. The night lamp illumination assembly 3 has a night lamp light exit surface 301 where night lamp light exits, and the housing 1 is provided with a night lamp light exit port 102 for exposing the night lamp light exit surface 301. A light shielding member 4 capable of shielding light is arranged between the main illumination assembly 2 and the night lamp illumination assembly 3.

With the above structure, the user may operate the lamp with a night lamp function to make the main illumination assembly 2 or the night lamp illumination assembly 3 work. When the main illumination assembly 2 works, the main illumination light exits from the main light exit surface 201 on the main illumination assembly 2 and irradiates the outside of the housing 1 through the main light exit port 1011 on the housing 1, thereby providing illumination for the user. When the night lamp illumination assembly 3 works, the night lamp light exits from the night lamp light exit surface 301 on the night lamp illumination assembly 3 and irradiates the outside of the housing 1 through the night lamp light exit port 102 on the housing 1, thereby providing illumination for the user. Usually, the night lamp light emitted by the night lamp illumination assembly 3 is softer and has lower brightness and/or color temperature than the main illumination light emitted by the main illumination assembly, which is suitable as a night lamp for the user to get up in the night to illuminate.

In the above structure, the light shielding member 4 arranged can prevent the main illumination assembly 2 and the night lamp illumination assembly 3 from interfering with and influencing each other. Specifically, the light shielding member 4 is a light shielding piece.

Further, the night lamp light exit port 102 is arranged between the main light exit surface 201 and the first housing panel 101 and located on a side close to the main light exit port 1011, and light exiting from the night lamp light exit surface 301 passes through the night lamp light exit port 102 and then irradiates the outside of the housing 1 through the main light exit port 1011.

With the above structure, since both the main illumination light and the night lamp light irradiate the outside of the housing 1 through the main light exit port 1011 on the housing 1, and there is no need to consider whether the mounting environment shields the main illumination light and the night lamp light when mounting the lamp with a night lamp function, so this application has low requirements for the mounting environment of the lamp. Moreover, the structure of this application is compact and reasonable.

Further, the night lamp illumination assembly includes a night lamp support 302 and a night lamp body 303 for emitting night lamp light, and the night lamp support 302 is arranged between the first housing panel 101 and the main light exit surface 201. The night lamp support 302 has a night lamp body accommodating groove 3021 for accommodating the night lamp body 303. The night lamp body 303 is arranged in the night lamp body accommodating groove 3021, and at least a part of the night lamp support 302 opposite to a light exit side of the night lamp body 303 is made of a light-transparent material. An outer side surface of the night lamp support 302 opposite to the light exit side of the night lamp body 303 and away from the night lamp body 303 forms the night lamp light exit surface 301.

With the above structure, the night lamp support 302 is configured to support the main illumination assembly 2 such that the main light exit surface 201 of the main illumination assembly 2 is arranged at a distance from the first housing panel 101, and the night lamp support 302 arranged provides the mounting environment for the mounting of the night lamp body 303. Moreover, at least a part of the night lamp support 302 is made of the light-transparent material, so that the light emitted by the night lamp body 303 is emitted to the side of the night lamp light exit port 102 through the light-transparent part of the night lamp support 302, and finally exits through the outer side surface of the night lamp support 302 away from the night lamp body 303 so as to irradiate the outside of the housing 1 through the night lamp light exit port 102, that is, the outer side surface of the night lamp support 302 opposite to the light exit side of the night lamp body 303 and away from the night lamp body 303 forms the night lamp light exit surface 301. Specifically, the whole night lamp support 302 is made of the light-transparent material, which is convenient for production of the night lamp support 302.

Further, a light exit direction of the night lamp body 303 faces an axis of the main light exit port 1011.

With the above structure, the night lamp light exit port 102 is arranged on the side close to the main light exit port 1011, and the light emitted by the night lamp body 303 can pass through the night lamp light exit port 102 and irradiate the outside of the housing 1 through the main light exit port 1011. The above structure is reasonable in arrangement.

Further, the night lamp support 302 includes a supporting plate portion 3022 and a supporting leg portion 3023, and the supporting plate portion is arranged opposite to the first housing panel 101 and arranged at a distance from the first housing panel 101. One end of the supporting leg portion 3023 is arranged on a side of the supporting plate portion 3022 facing the first housing panel 101, and the other end extends toward the first housing panel 101.

Side walls of the supporting plate portion 3022, the first housing panel 101, the supporting leg portion 3023 and the housing 1 are enclosed to form the night lamp body accommodating groove 3021; or a plurality of the supporting leg portions 3023 are provided, and the supporting plate portion 3022, the first housing panel 101 and the two adjacent supporting leg portions 3023 are enclosed to form the night lamp body accommodating groove 3021.

With the above structure, due to the arrangement of the supporting plate portion 3022, the main light exit surface 201 of the main illumination assembly 2 can be placed on the night lamp support 302 more stably and reliably. The supporting leg portion 3023 is arranged to support the supporting plate portion 3022.

Further, the first housing panel 101 protrudes toward the supporting plate portion 3022 to form a support limit rib 1012. The supporting plate portion 3022 is respectively provided with the supporting leg portions 3023 on two sides of a position corresponding to the support limit rib.

With the above structure, the support limit rib arranged can position the night lamp support when mounting the night lamp support 302. During use, the support limit rib cooperates with the supporting leg portions 3023 on the two sides to limit the night lamp support 302 and prevent the night lamp support from deviating.

Further, an outer side surface of the supporting leg portion 1011 close to a side of the main light exit port 3023 forms the night lamp light exit surface 301; or the night lamp support 302 includes an outer side portion 3024, the outer side portion 3024 is arranged on a side away from the night lamp body 303 in the supporting leg portion 3023 away from the night lamp body 303, and the outer side portion 3024 is arranged opposite to the light exit side of the night lamp body 303; and one end of the outer side portion 3024 is connected with an end facing the first housing panel 101 in the supporting leg portion 3023 close to the side of the main light exit port 1011, and the other end extends toward the main light exit surface 201. A side of the outer side portion 3024 away from the night lamp body 303 forms the night lamp light exit surface 301.

With the above structure, the structure of the night lamp support 302 is more reasonable.

Further, along a direction from the main light exit port 1011 to the main light exit surface 201, the outer side portion 3024 is inclined a side away from the night lamp body 303.

With the above structure, the structure of the night lamp support 302 is more reasonable. Since the outer side portion 3024 is inclined, the night lamp light exit surface 301 is also inclined, which makes light exiting from the night lamp illumination assembly 3 more reasonable.

Further, a side of the outer side portion 3024 facing the supporting leg portion 3023 is stepped.

With the above structure, the structure of the outer side portion 3024 is more stable and reliable, and the night lamp light is refracted and reflected at the stepped side of the outer side portion 3024, which finally makes the light exiting from the night lamp light exit surface 301 softer.

Further, the night lamp illumination assembly includes a night lamp body 303 for emitting night lamp light. Along the direction from the main light exit port 1011 to the main light exit surface 201, the night lamp light exit surface 301 is inclined a side away from the night lamp body 303.

The above structure makes the night lamp light exit surface 301 more reasonable in arrangement and the light exiting from the night lamp illumination assembly 3 more reasonable.

Further, the night lamp light exit surface 301 is stepped. Specifically, the night lamp light exit surface 301 includes first night lamp light exit surfaces 3011 and second night lamp light exit surfaces 3012, and along the direction from the main light exit port 1011 to the main light exit surface 201, the first night lamp light exit surfaces 3011 and the second night lamp light exit surfaces 3012 are alternately arranged. The second night lamp light exit surfaces 3012 are arranged parallel with the first housing panel 101, and the first night lamp light exit surfaces 3011 are arranged at an obtuse angle with the second night lamp light exit surfaces 3012.

With the above structure, the night lamp light is refracted and reflected at the night lamp light exit surface 301, which finally makes the light exiting from the night lamp light exit surface 301 softer.

Further, the night lamp illumination assembly 3 is annular and is arranged around an axis of the main light exit surface 201. Correspondingly, the light shielding member 4 is annular and is matched with the night lamp illumination assembly 3.

With the above structure, the structure of the night lamp illumination assembly 3 and the light shielding member 4 is more reasonable in arrangement.

Further, a night lamp body 303 in the night lamp illumination assembly 3 is strip-shaped and is arranged around the axis of the main light exit surface 201.

With the above structure, the structure of the night lamp body 303 in the night lamp illumination assembly 3 is more reasonable in arrangement. Specifically, the night lamp body 303 in the night lamp illumination assembly 3 is a strip lamp provided with a plurality of LED light beads.

Further, the main illumination assembly 2 includes a main illumination lamp body 202 for emitting the main illumination light and a light guide plate 203 for guiding light. A light exit side of the light guide plate 203 is arranged opposite to the main light exit port 1011, and the main illumination lamp body 202 is arranged on a light entrance side of the light guide plate 203.

With the above structure, the main illumination light emitted by the main illumination lamp body 202 is guided to the light exit side of the light guide plate 203 through the light guide processing of the light guide plate 203 and irradiates the outside of the housing 1 through the main light exit port 1011.

Further, the main illumination assembly 2 includes a reflective member 204, and a side surface of the light guide plate 203 forms the light entrance side of the light guide plate 203. The reflective member 204 is arranged on a side of the light guide plate 203 opposite to the light exit side of the light guide plate, and a size of the reflective member 204 is matched with that of a side end surface of the light guide plate 203 opposite to the light exit side.

With the above structure, the reflective member 204 arranged reflects the light to be emitted from the side of the light guide plate 203 opposite to the light exit side, so that light exits from the light exit side of the light guide plate 203, thereby ensuring the light utilization ratio. Specifically, the reflective member 204 is reflective paper.

Further, the main illumination assembly 2 includes a diffusing plate 205. The diffusing plate 205 is arranged on the light exit side of the light guide plate 203, and a side end surface of the diffusing plate away from the light guide plate 203 forms the main light exit surface 201.

With the above structure, the diffusing plate 205 can convert a point or line light source into a soft and uniform surface light source.

Further, the main illumination lamp body 202 is strip-shaped and is arranged around an axis of the light guide plate 203.

With the above structure, the structure of the main illumination lamp body 202 is more reasonable. Specifically, the main illumination lamp body 202 is a strip lamp provided with a plurality of LED light beads.

Further, the lamp with a night lamp function includes a shock absorbing member 5. The shock absorbing member 5 is arranged between a side of the main illumination assembly 2 opposite to the main light exit surface 201 and an inner wall of the housing 1. Specifically, the shock absorbing member 5 is a foam pad.

With the above structure, the shock absorbing member 5 arranged can absorb shock of the main illumination assembly 2 and the night lamp illumination assembly 3 in the housing 1, so as to protect the main illumination assembly 2 and the night lamp illumination assembly 3.

Further, the lamp with a night lamp function includes a power supply 6, and the power supply 6 is connected with the main illumination assembly 2 and the night lamp illumination assembly 3 to provide energy therefor. Specifically, the power supply 6 is a power adapter.

With the above structure, external power can be converted into power adapted to the main illumination assembly 2 and the night lamp illumination assembly 3, so as to ensure the normal operation of the main illumination assembly 2 and the night lamp illumination assembly 3.

Further, two sides of the housing 1 are provided with torsion spring clips 7 for fixing the lamp with a night lamp function. Correspondingly, the housing 1 is provided with clip seats 103 for mounting the torsion spring clips 7.

With the above structure, due to the arrangement of the torsion spring clips 7, the lamp with a night lamp function can be mounted and fixed more quickly and conveniently.

Further, the torsion spring clip 7 includes a torsion spring 701 arranged on the housing 1 and a clip sleeve 702 sleeved on the torsion spring 701.

With the above structure, due to the arrangement of the clip sleeves 702, forces can be better applied to the torsion spring clips 7, thereby ensuring the lamp with a night lamp function to be mounted and fixed stably and reliably.

Further, the housing 1 includes a housing body 104 having a mounting opening 1041 and a housing cover 105 matched with the mounting opening 1041, and the housing body 104 and the housing cover 105 are enclosed to form a space for mounting the main illumination assembly 2 and the night lamp illumination assembly 3.

With the above structure, the lamp with a night lamp function can be mounted conveniently. Specifically, the main illumination assembly 2 and the night lamp illumination assembly 3 can be mounted into the housing 1 conveniently.

Further, the housing body 104 includes a surface ring 1042 and a surface ring enclosure wall 1043. The surface ring 1042 forms the first housing panel 101. An inner hole of the surface ring 1042 forms the main light exit port 1011. One end of the surface ring enclosure wall 1043 is connected with the surface ring 1042, and the other end extends outward and forms the mounting opening 1041.

With the above structure, the structure of the housing body 104 is more reasonable.

For the same or similar parts between the embodiments in the specification, reference may be made to each other. Each embodiment focuses on differences from other embodiments.

The foregoing descriptions are merely specific implementations of this application, but the protection scope of this application is not limited thereto. Any variation or replacement readily figured out by those skilled in the art within the technical scope disclosed in this application shall fall within the protection scope of this application. Therefore, the protection scope of this application shall be subject to the protection scope of the claims.

What is claimed is:

1. A lamp with a night lamp function, comprising a housing, and a main illumination assembly and a night lamp illumination assembly arranged in the housing, wherein the main illumination assembly has a main light exit surface where main illumination light exits, a first housing panel of the housing opposite to the main light exit surface is provided with a main light exit port, and light exiting from the main light exit surface irradiates an outside of the housing through the main light exit port; the first housing panel is arranged at a distance from the main light exit surface in an axial direction, the night lamp illumination assembly is arranged between the main light exit surface and the first housing panel, the night lamp illumination assembly has a night lamp light exit surface where night lamp light exits, and the housing is provided with a night lamp light exit port for exposing the night lamp light exit surface; and a light shielding member capable of shielding light is arranged between the main illumination assembly and the night lamp illumination assembly; and wherein the night lamp illumination assembly comprises a night lamp support and a night lamp body for emitting night lamp light, and the night lamp support is arranged between the first housing panel and the main light exit surface; the night lamp support has a night lamp body accommodating groove for accommodating the night lamp body, the night lamp body being arranged in the night lamp body accommodating groove, and at least a part of the night lamp support opposite to a light exit side of the night lamp body being made of a light-transparent material; and an outer side surface of the night lamp support opposite to the light exit side of the night lamp body and away from the night lamp body forms the night lamp light exit surface; and a light exit direction of the night lamp body faces an axis of the main light exit port.

2. The lamp with a night lamp function according to claim 1, wherein the night lamp support comprises a supporting plate portion and a supporting leg portion, and the supporting plate portion is arranged opposite to the first housing panel and arranged at a distance from the first housing panel, one end of the supporting leg portion being arranged on a side of the supporting plate portion facing the first housing panel, and the other end extending toward the first housing panel; and side walls of the supporting plate portion, the first housing panel, the supporting leg portion and the housing are enclosed to form the night lamp body accommodating groove; or a plurality of the supporting leg portions are provided, and the supporting plate portion, the first housing panel and the two adjacent supporting leg portions are enclosed to form the night lamp body accommodating groove.

3. The lamp with a night lamp function according to claim 2, wherein an outer side surface of the supporting leg portion close to a side of the main light exit port forms the night lamp light exit surface; or the night lamp support comprises an outer side portion, the outer side portion is arranged on a side away from the night lamp body in the supporting leg portion away from the night lamp body, and the outer side portion is arranged opposite to the light exit side of the night lamp body; and one end of the outer side portion is connected with an end facing the first housing panel in the supporting leg portion close to the side of the main light exit port, and the other end extends toward the main light exit surface, a side of the outer side portion away from the night lamp body forming the night lamp light exit surface.

4. The lamp with a night lamp function according to claim 3, wherein along a direction from the main light exit port to the main light exit surface, the outer side portion is inclined a side away from the night lamp body; and a side of the outer side portion facing the supporting leg portion is stepped.

5. The lamp with a night lamp function according to claim 2, wherein the first housing panel protrudes toward the supporting plate portion to form a support limit rib; and the supporting plate portion is respectively provided with the supporting leg portions on two sides of a position corresponding to the support limit rib.

6. The lamp with a night lamp function according to claim 1, wherein the night lamp light exit port is arranged between the main light exit surface and the first housing panel and located on a side close to the main light exit port, and light exiting from the night lamp light exit surface passes through the night lamp light exit port and then irradiates the outside of the housing through the main light exit port.

7. The lamp with a night lamp function according to claim 1, wherein the night lamp illumination assembly comprises a night lamp body for emitting night lamp light; and along a direction from the main light exit port to the main light exit surface, the night lamp light exit surface is inclined a side away from the night lamp body;

the night lamp light exit surface is stepped; and the night lamp light exit surface comprises first night lamp light exit surfaces and second night lamp light exit surfaces, and along the direction from the main light exit port to the main light exit surface, the first night lamp light exit surfaces and the second night lamp light exit surfaces are alternately arranged; and the second night lamp light exit surfaces are arranged parallel with the first housing panel, and the first night lamp light exit surfaces are arranged at an obtuse angle with the second night lamp light exit surfaces.

8. The lamp with a night lamp function according to claim 1, wherein the night lamp illumination assembly is annular and is arranged around an axis of the main light exit surface; correspondingly, the light shielding member is annular and is matched with the night lamp illumination assembly;

the night lamp body in the night lamp illumination assembly is strip-shaped and is arranged around the axis of the main light exit surface;

the main illumination assembly comprises a main illumination lamp body for emitting the main illumination light and a light guide plate for guiding light, a light exit side of the light guide plate being arranged opposite to the main light exit port, and the main illumination lamp body being arranged on a light entrance side of the light guide plate;

the main illumination assembly further comprises a reflective member and a diffusing plate, and a side surface of the light guide plate forms the light entrance side of the light guide plate; the reflective member is arranged on a side of the light guide plate opposite to the light exit side of the light guide plate, and a size of the reflective member is matched with that of a side end surface of the light guide plate opposite to the light exit side; the diffusing plate is arranged on the light exit side of the light guide plate, and a side end surface of the diffusing plate away from the light guide plate forms the main light exit surface; and the main illumination lamp body is strip-shaped and is arranged around an axis of the light guide plate.

9. The lamp with a night lamp function according to claim 1, comprising a shock absorbing member, wherein the shock absorbing member is arranged between a side of the main illumination assembly opposite to the main light exit surface and an inner wall of the housing;

the shock absorbing member is a foam pad;

the lamp with a night lamp function comprises a power supply, and the power supply is connected with the main illumination assembly and the night lamp illumination assembly to provide energy therefor;

two sides of the housing are provided with torsion spring clips for fixing the lamp with a night lamp function; correspondingly, the housing is provided with clip seats for mounting the torsion spring clips;

the torsion spring clip comprises a torsion spring arranged on the housing and a clip sleeve sleeved on the torsion spring;

the housing comprises a housing body having a mounting opening and a housing cover matched with the mounting opening, and the housing body and the housing cover are enclosed to form a space for mounting the main illumination assembly and the night lamp illumination assembly; and the housing body comprises a surface ring and a surface ring enclosure wall, the surface ring forming the first housing panel, an inner hole of the surface ring forming the main light exit port, one end of the surface ring enclosure wall being connected with the surface ring, and the other end extending outward and forming the mounting opening.

* * * * *